United States Patent Office 3,529,026
Patented Sept. 15, 1970

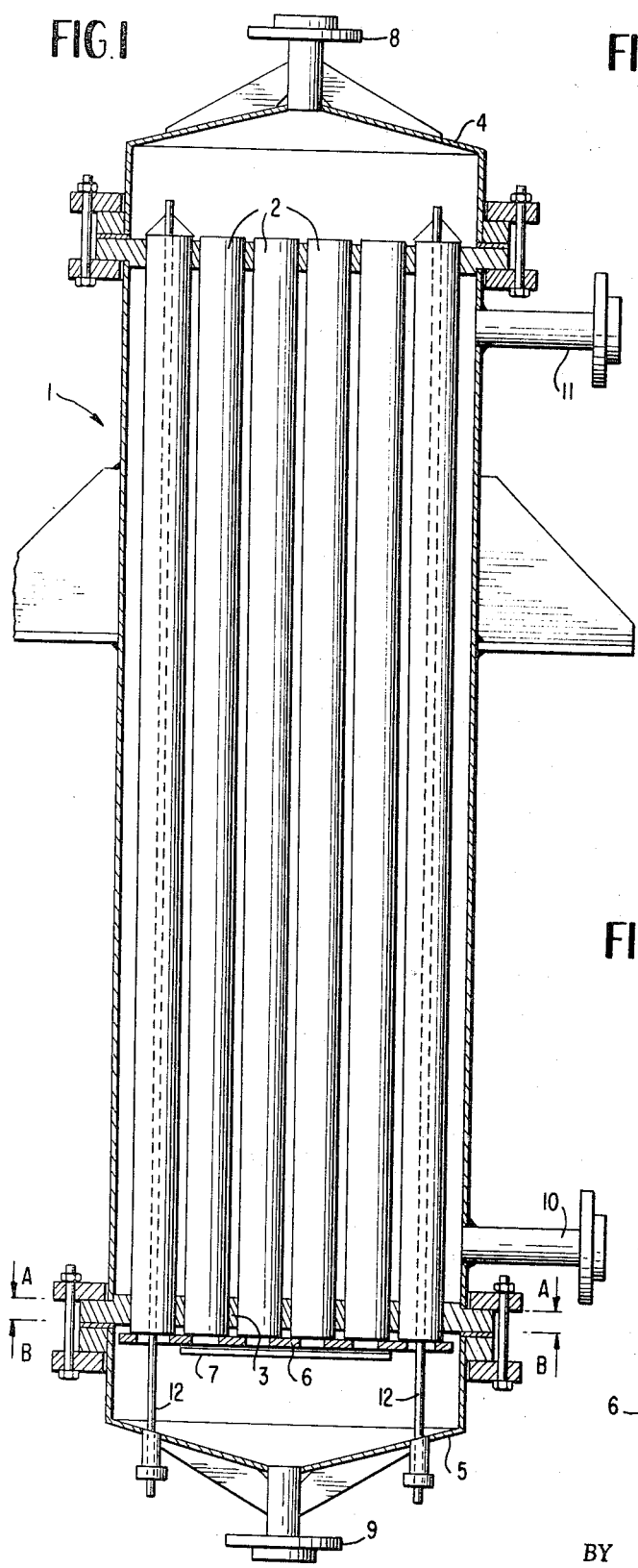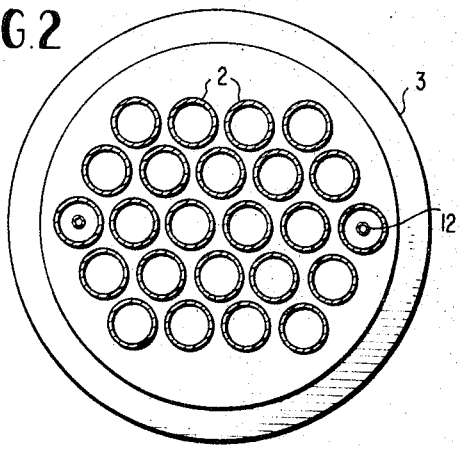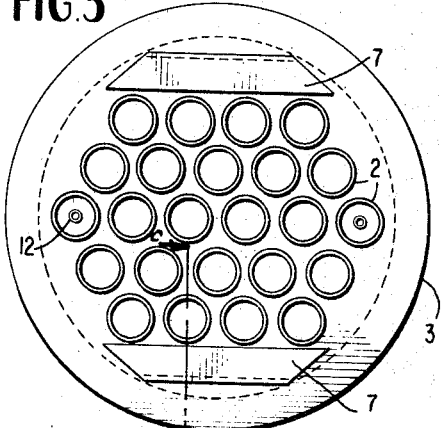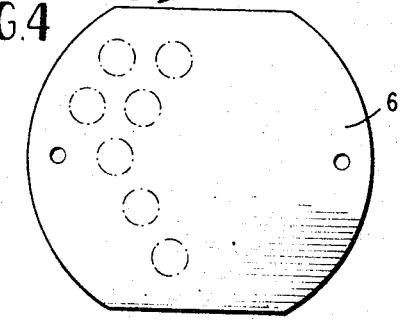

3,529,026
APPARATUS AND PROCESS FOR THE
PRODUCTION OF VINYL FLUORIDE
Alfred Blumcke and Peter Fischer, Rheinfelden, and
Walter Krings, Aachen, Germany, assignors to Dynamit
Nobel Aktiengesellschaft, Troisdorf, Germany
Filed Dec. 23, 1966, Ser. No. 604,461
Claims priority, application Germany, Dec. 22, 1965,
D 48,982
Int. Cl. B01j 9/04; C07c 17/04, 21/18
U.S. Cl. 260—653.4                                21 Claims

ABSTRACT OF THE DISCLOSURE

The present disclosure relates to an apparatus and process for producing vinyl fluoride from the catalytic reaction of acetylene and hydrogen fluoride. The catalyst deterioration normally encountered in this reaction is prevented by using a reactor having the inner surfaces thereof, which come into contact with the reaction mixture, made of or lined with a synthetic polymer that is resistant to hydrogen fluoride. A continuous operation can be obtained by connecting the reactors in series and starting up a fresh reactor when acetylene is detected in the latter reactor in the chain. Meanwhile, the spent reactor can be removed from the chain, cleaned, and recharged and later added to the chain for further use therein.

BACKGROUND OF THE INVENTION

This invention relates to an apparatus and a process for producing vinyl fluoride. In particular, this invention relates to an improved means and method for making vinyl fluoride from acetylene and hydrogen fluoride.

It is known in the prior art to prepare vinyl fluoride by the direct addition of hydrogen fluoride to acetylene. This is, thus, a process similar to the very well known and large scale production of vinyl chloride by the addition of hydrogen chloride to acetylene. Very similar catalysts, for example, mercury salts on active carbon, have been described in numerous modifications of these processes and are required for both reactions. However, the optimum temperature ranges in which these two reactions are carried out are very different, in spite of the fact that the reactions are prima facie very similar. The preparation of vinyl fluoride by the reaction of hydrogen fluoride with acetylene is effected at temperatures below 100° C., whereas temperatures of from 180° to 200° C. are required in order to attain a sufficient speed of reaction in the preparation of vinyl chloride from hydrogen chloride and acetylene.

The serviceable life of the catalysts employed in the two reactions is markedly different. This is a rather significant factor with respect to the economy of the process. While it is possible to attain a working life of up to several years in the case of the catalysts used for the vinyl chloride synthesis, it has only been possible to achieve up to now a serviceable catalyst life of only about 10 to a maximum of about 100 hours for the catalysts used in the preparation of vinyl fluoride. This is particularly true with the customary technical apparatus used at present for the preparation of vinyl fluoride and especially if the outlet gases are substantially purified.

Accordingly, one of the objects of the present invention is to provide an improved apparatus and process for the preparation of vinyl fluoride which overcomes the disadvantages and deficiencies of the prior art.

Another object of the present invention is to provide an economical and efficacious process for the preparation of vinyl fluoride.

Still another object of the present invention is to prevent the rapid deterioration of the catalysts customarily employed in the preparation of vinyl fluoride from hydrogen fluoride and acetylene.

These and other objects and advantages of the present invention will become apparent to those skilled in the art from a consideration of the attached drawing and the following specification and claims.

SUMMARY OF THE INVENTION

It has been found that the rapid deterioration of the catalyst activity in the preparation of vinyl fluoride from hydrogen fluoride and acetylene results from the fact that high molecular weight polymers and resins are deposited on the surface of the catalyst during the prolonged course of the process. This occurs to an increased extent because of the contact of the reaction mixture with metallic parts of the reactor. As a consequence, the serviceable life of the catalyst is considerably decreased.

In accordance with the present invention, the serviceable life of the catalyst is considerably increased if all of the interior surfaces of the reactor consist exclusively of hydrogen fluoride-resistant synthetic polymers (plastic materials). In this way, the action of the metals on the gases and the catalyst which participate in the reaction is substantially completely eliminated.

Following the proposal of the present invention, it has been possible to attain a working life of up to 1,000 hours and more and, for periods of the order from 6 to 8 days, a 100% exchange or reaction of the acetylene employed. However, this does not represent the upper limit which may be achieved. The exchange or yield from acetylene, which slowly decreased after this period of time, could additionally be kept at virtually 100% for an even longer period of time by connecting in a further reactor of the same type with a fresh charge of reactants.

With due regard to the operating temperatures employed, it has been found that synthetic polymers such as polyethylene, polypropylene and Teflon (polytetrafluoroethylene) are suitable hydrogen fluoride-resistant synthetic materials which may be expediently employed. Polymers made by polycondensation, such as polyamides, are also suitably employed. The particular type of synthetic polymer used essentially depends upon the size of the reactor. In tubular reactors having tubes of conventional diameter and a length of, for example, up to about 1.5 meters, actual plastic tubes, plastic tubular bottoms and plastic lids or covers may be quite readily employed. On the other hand, with greater length tubes, it becomes necessary to reinforce the synthetic plastic material. This may be accomplished by providing an exterior rib construction on the tubes, consisting either of the same or a different material, and particularly by applying the synthetic plastic material as a lining to the inside of the metal tubes, bottoms and lids. The metal parts of these reactors are conventionally or expediently made of iron or steel. In this case, the disadvantage of the poor heat conductivity of the plastic material may be easily counteracted in an absolutely satisfactory manner by selecting a correspondingly small wall thickness and diameter for the tubes or tube linings.

BRIEF DESCRIPTION OF THE DRAWING

FIG. 1 shows a view of one embodiment of a reactor which may be employed in accordance with the present invention;

FIG. 2 is a sectional view taken along the line A—A of FIG. 1;

FIG. 3 is a sectional view taken along the line B—B of FIG. 1;

FIG. 4 is a plan view of plate 6; and

FIG. 5 is an enlarged sectional view taken along the line C—C of FIG. 3.

Reactor 1 comprises a plurality of tubes 2 made from a synthetic polymer, for example, polypropylene. The tubes are of a size expedient for their use, such as 40 x 38 x 1000 mm. The tubes are welded into a tube bottom 3, which is also made of a plastic material such as polypropylene. The two reactor covers or lids 4 and 5 are likewise made of a synthetic plastic such as polypropylene and are threadedly connected with the reactor by means of a steel flange. A polyethylene seal, for example, is provided between the tube bottom and the respective adjacent lid portion. Plate 6 is provided between tube bottom 3 and flange 7. Holes are drilled therein at the desired size by the ultimate user of the apparatus.

In use, the gaseous reactants enter inlet means 8 and distribute themselves between reactor cover 4 and the top of the tubes. The gases flow down through the tubes, reacting therewithin, and the product comes out between the bottom of the tubes and reactor cover 5. The gaseous product is finally removed through outlet means 9. A coolant, such as water, is circulated around the tubes, the coolant flowing in through connection 10 and leaving through connection 11. Thermometers for temperature control and maintained in tubes 12, these tubes being sealed off so as to provide an accurate measure of the temperature within the reactor.

These figures merely show one possible reactor embodiment structure of the present invention. Obviously, synthetic polymer-lined tank-type reactors may also be employed, i.e., without the use of a plurality of tubes. In such a case, a heat exchange means may be provided around the outside thereof.

EXAMPLES OF THE INVENTION

The following examples are given merely as illustrative of the present invention and are not to be considered as limiting. As evidenced therein, the provision of the reactor as proposed by the present invention makes it possible to suppress the disturbing formation of high molecular weight deposits on the catalyst, if not completely, at least to a very large extent. Accordingly, the full activity of the catalyst may be maintained for a period of time which is ten to twenty-five times as long as the case when the reaction is carried out in metallic reactors. Unless otherwise noted, the percentage figures given for the gases are by volume.

Example I

Vinyl fluoride is prepared in a reactor having tubes or conduits made of polypropylene and having an inside diameter of 38 mm. The catalyst employed, active carbon impregnated with mercury salts, is disposed in these tubes in a conventional manner.

A gas consisting essentially of a mixture of 35% acetylene and 65% hydrogen fluoride is circulated through the polypropylene tubes. The tubes are cooled from the outside thereof with water having a temperature of from 30° to 40° C. After the removal of the excess hydrogen fluoride, the residual gas is analyzed by gas chromatography, giving the following results:

TABLE I

| Duration of experiment (hours) | Vinyl fluoride (percent) | Acetylene (percent) |
| --- | --- | --- |
| 1-240 | 100.0 | |
| 264 | 99.9 | 0.1 |
| 288 | 99.7-99.9 | 0.3-0.1 |
| 312 | 99.0 | 1.0 |
| 336 | 98.0-99.0 | 2.0-1.0 |
| 358 | 98.0-99.0 | 2.0-1.0 |
| 382 | 97.5-98.0 | 2.5-2.0 |
| 406 | 95.8-96.4 | 4.2-3.6 |
| 430 | 94.4-97.4 | 5.6-2.6 |
| 454 | 95.8-97.4 | 4.2-2.6 |
| 480 | 94.2-97.7 | 5.8-2.3 |

No 1,1-difluoroethane was found in any case. At the end of the experiment, the catalyst can be easily removed from the tubes.

In contrast to the experiment described above using polypropylene tubes, a drop of the vinyl chloride concentration to about 50% is found after only 100 hours duration of reaction when the experiment is carried out in a steel reactor under completely identical conditions. Furthermore, the catalyst becomes strongly caked with polymers which makes the drainage or discharge of the reactor very difficult.

Example II

A reaction tube made of steel is lined with a Teflon foil which has a thickness of 0.1 mm. The bottom of the tube and the lid or top thereof are also made of steel but are not lined with Teflon foil. The preparation of vinyl fluoride is carried out in this reactor in the same manner as described in Example I. During the experiment, the vinyl fluoride concentration drops from 100 to 75% within 200 hours. However, the catalyst is not caked with polymers and impurities after the completion of this experiment.

However, in accordance with the present invention, the relatively simple expedient of lining the reaction tube with a thermoplastic material substantially delays the caking of the catalyst. Accordingly, a considerable increase in the serviceable life of the catalyst can be obtained.

An increased working life of the catalyst per se does not by itself assure a fully continuous operation of the process. In order to achieve this, in accordance with a further embodiment of the present invention, three or more reactors are operated in such a manner that initially only one reactor is operated or run until the acetylene breaks therethrough. Then, another reactor is connected in series with the first and both reactors are jointly operated until the acetylene again breaks through. Thereafter, a further newly charged reactor is connected in series with the last reactor while, at the same time, the first reactor, which by now is essentially exhausted, is taken out of the chain for the purpose of being recharged. This procedure is repeated with each further or successive break-through of acetylene so that two reactors connected in series with each other continue to be operated in succession throughout the duration of the continuous process.

Since, on the one hand, the reactors may be operated for a relatively long time before recharging is necessary and, on the other hand, the removal of the catalyst from the reactors and the recharge thereof requires merely a much shorter period of time, it is possible to carry out a fully continuous operation in a cyclic procedure even with a total of only three reactors. This is apparent from the additional examples described hereinbelow.

Example IIIa

In a manner analogous to Example I, the addition of hydrogen fluoride to acetylene is first carried out in a reactor made of polypropylene having tubes with a thickness of 38 mm. and a length of 1,000 mm. The acetylene is completely reacted until finally only 0.2% of acetylene is found in the waste gas of the reactor after continuing the experiment for 192 hours. In order to react the residual acetylene, a modified iron reactor with tubes having a diameter of 80 mm. and a length of 500 mm. is connected in series with the polypropylene reactor. The lid or cover, the tubes and the bottoms of said iron reactor are coated with a Teflon layer which is applied by means of flame-spraying. This coating prevents a contact of the reaction mixture with the iron.

After the reaction gas has circulated through the two reactors, the excess hydrogen fluoride is removed and the gas is analyzed. After a duration of the experiment of 1,000 hours, the gas is found to contain merely 0.8 to 1.0% of acetylene. Thus, a continuation of the reaction would be readily possible. After these 1,000 hours, the two reactors are opened and the catalyst is removed from the reactor tubes without difficulty.

Example IIIb

Added to the two reactors 1 and 2 described in Example IIIa is another polypropylene reactor 3, of the type described in Example I. All three of the reactors are connected in a cycle so that the introduction of the reaction mixture and the discharge of the reaction products are possible between only two of the reactors. After just about 200 hours of operation of the first reactor with 0.6 Nm.$^3$ (gas volume of one cubic meter under normal conditions, i.e., at 760 mm. Hg and 0° C.) of acetylene and 0.7 kg./hr. of hydrogen fluoride, acetylene appears in the amount of a few tenths percent so that reactors 1 and 2 are then connected in series. After another 450 hours, a few more tenths percent of acetylene can be detected in reactors 2. Thereupon, the reactors 2 and 3 are connected in series and reactor 1 is removed from the chain for the purpose of being recharged. After the discharge of residual gases, cleaning and recharging, which requires about one day, i.e., approximately 24 hours, reactor 1 is again installed in the chain of reactors and saturated with hydrogen fluoride. This latter step again requires approximately 24 hours. After 430 hours after starting reactor 3 into operation, acetylene can be detected at the outlet thereof so that it is then necessary to switch the operation over to the two reactors 3 and 1. In the further course of the continuous process and after corresponding periods of time, the operation is switched over to the reactors 1 and 2, etc., in sequence. Thus, the operation is continued by connecting the newly charged reactor into the system and disconnecting the exhausted or weakened reactor therefrom. Two reactors are connected in series at all times. In this manner, a fully continuous operation may be maintained with an average yield of 1.16 kg. of vinyl fluoride. This corresponds to a theoretical yield of 90.6%, based on the amount of acetylene employed.

While the process and apparatus of the present invention have been specifically shown in connection with the use of a catalyst of mercury salts on active carbon, it is to be understood that other catalysts customarily employed for the reaction of hydrogen fluoride with acetylene to produce vinyl fluoride which experience a rapid deterioration during the course of the reaction may also be employed in the present invention. In this manner, the serviceable life of such catalyst is substantially increased. Mercury salts are the preferred catalysts, particularly mercuric nitrate and mercuric oxide. It is also to be noted that the present invention is applicable to all of the process conditions suitably employed for the preparation of vinyl fluoride from acetylene and hydrogen fluoride. Such conditions are well known and may be found in the prior art.

The invention being thus described, it will be obvious that the same may be varied in many ways. Such variations are not to be regarded as a departure from the spirit and scope of the invention, and all such modifications as would be obvious to one skilled in the art are intended to be included herein.

We claim:

1. A reactor for the catalytic preparation of vinyl fluoride from acetylene and hydrogen fluoride comprising a reaction vessel, said reaction vessel being provided with a plurality of reaction tubes having disposed therein a catalyst comprising a mercury salt, said reaction tubes communicating at the respective ends of said vessel with an inlet chamber and an outlet chamber, substantially all of the surfaces of said reaction vessel and said reaction tubes which come into contact with the reaction mixture consisting of a synthetic polymer that is resistant to hydrogen fluoride and prevents undesirable side reactions, inlet means for introducing the reactants into the inlet chamber and outlet means for removing the product from the outlet chamber, whereby the deterioration of said catalyst resulting from undesirable side reactions is substantially prevented.

2. A reactor according to claim 1, wherein said reaction vessel is tubular.

3. A reactor according to claim 1, wherein a mercury salt deposited on active carbon is disposed within said reaction tubes as the catalyst.

4. A reactor according to claim 1, wherein said synthetic polymer is an addition polymer selected from the group consisting of polyethylene, polypropylene and polytetrafluoroethylene.

5. A reactor according to claim 1, wherein said synthetic polymer is a condensation polymer.

6. A reactor according to claim 5, wherein said condensation polymer is a polyamide.

7. A reactor according to claim 1, wherein said reaction vessel is metallic and wherein at least the surfaces thereof which come into contact with the reaction mixture are lined with a synthetic polymer that is resistant to hydrogen fluoride.

8. A reactor according to claim 2, wherein at least said reaction tubes are made of a synthetic polymer that is resistant to hydrogen fluoride.

9. A continuous process for the catalytic preparation of vinyl fluoride from acetylene and hydrogen fluoride in a chain of at least three reactors, each of said reactors comprising a reaction vessel, said reaction vessel being provided with a plurality of reaction tubes having disposed therein a catalyst comprising a mercury salt, said reaction tubes communicating at the respective ends of said vessel with an inlet chamber and an outlet chamber, substantially all of the surfaces of said reaction vessel and said reaction tubes which come into contact with the reaction mixture consisting of a synthetic polymer that is resistant to hydrogen fluoride and prevents undesirable side reactions, inlet means for introducing the reactants into the inlet chamber and outlet means for removing the product from the outlet chamber, whereby the deterioration of said catalyst resulting from undesirable side reactions is substantially prevented, which comprises carrying out the reaction of acetylene with hydrogen fluoride in a first reactor until acetylene is detected at the outlet thereof, then introducing the reaction mixture into a second reactor connected in series with said first reactor and carrying out said reaction in said first and second reactors jointly until acetylene is detected at the outlet of said second reactor, and, from then on and in a continuous repetition, with each detection of acetylene at the outlet of the latter reactor in the chain, the reaction mixture is introduced into a further freshly charged reactor connected in series in the chain and operated jointly with the reactor last set into operation, and the reactor first set into operation and weakened in its catalytic activity is removed from the chain in order to be recharged.

10. A process according to claim 9, wherein the catalyst disposed in said reaction tubes is a mercury salt deposited on active carbon.

11. A process according to claim 9, wherein said synthetic polymer is an addition polymer selected from the group consisting of polyethylene, polypropylene and polytetrafluoroethylene.

12. A reactor for the catalytic preparation of vinyl fluoride from acetylene and hydrogen fluoride comprising a reaction vessel having disposed therein a catalyst comprising a mercury salt, substantially all of the surfaces of said reaction vessel which come into contact with the reaction mixture consisting of a synthetic polymer that is resistant to hydrogen fluoride and prevents undesirable side reactions, inlet means for introducing the reactants into said reaction vessel and outlet means for removing the product from said reaction vessel, whereby the deterioration of said catalyst resulting from undesirable side reactions is substantially prevented.

13. A reactor according to claim 12, wherein said synthetic polymer is selected from the group consisting of polyethylene, polypropylene and polytetrafluoroethylene.

14. A reactor according to claim 12, wherein said synthetic polymer is a polyamide.

15. A reactor according to claim 12, wherein said reaction vessel is metallic and wherein the surfaces thereof which come into contact with the reaction mixture are lined with said synthetic polymer.

16. A reactor according to claim 12, wherein said reaction vessel is made of said synthetic polymer.

17. In a process for the catalytic preparation of vinyl fluoride from acetylene and hydrogen fluoride, the improvement of substantially preventing the deterioration of the catalyst by undesirable side reactions which comprises conducting the reaction of acetylene with hydrogen fluoride to form vinyl fluoride in a reaction vessel having disposed therein a catalyst comprising a mercury salt, substantially all of the surfaces of said reaction vessel which come into contact with the reaction mixture consisting of a synthetic polymer that is resistant to hydrogen fluoride and prevents undesirable side reactions, inlet means for introducing the reactants into said reaction vessel and outlet means for removing the product from said reaction vessel, whereby the deterioration of said catalyst resulting from undesirable side reactions is substantially prevented.

18. A process according to claim 17, wherein said synthetic polymer is selected from the group consisting of polyethylene, polypropylene and polytetrafluoroethylene.

19. A process according to claim 17, wherein said reaction vessel is provided with a plurality of reaction tubes having disposed therein a catalyst comprising a mercury salt, said reaction tubes communicating at the respective ends of said vessel with an inlet chamber and an outlet chamber, inlet means for introducing the reactants into the inlet chamber and outlet means for removing the product from the outlet chamber.

20. A process according to claim 19, wherein said reaction tubes are made of said synthetic polymer.

21. A process according to claim 19, wherein said synthetic polymer is selected from the group consisting of polyethylene, polypropylene and polytetrafluoroethylene.

References Cited

UNITED STATES PATENTS

| | | | |
|---|---|---|---|
| 2,959,572 | 11/1960 | Blanchette | 260—78 |
| 3,317,619 | 5/1967 | Hedge | 260—653.4 |
| 3,395,187 | 7/1968 | Christoph | 260—653.6 |
| 3,050,786 | 8/1962 | St. John et al. | 138—143 X |
| 3,354,232 | 11/1967 | Soulen et al. | 260—653 |

FOREIGN PATENTS

| | | |
|---|---|---|
| 1,054,101 | 9/1959 | Germany. |
| 1,160,429 | 1/1964 | Germany. |
| 1,160,430 | 1/1964 | Germany. |
| 691,773 | 5/1953 | Great Britain. |

JOSEPH SCOVRONEK, Primary Examiner

U.S. Cl. X.R.

23—288, 252